United States Patent
Lastras-Montano

(10) Patent No.: US 8,024,642 B2
(45) Date of Patent: Sep. 20, 2011

(54) SYSTEM AND METHOD FOR PROVIDING CONSTRAINED TRANSMISSION AND STORAGE IN A RANDOM ACCESS MEMORY

(75) Inventor: Luis A. Lastras-Montano, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1056 days.

(21) Appl. No.: 11/846,814

(22) Filed: Aug. 29, 2007

(65) Prior Publication Data

US 2009/0063759 A1     Mar. 5, 2009

(51) Int. Cl.
*G11C 29/00* (2006.01)
(52) U.S. Cl. ........................... 714/763; 711/104
(58) Field of Classification Search .............. 360/75; 369/47.53; 341/83; 375/341; 714/764, 768, 714/763; 711/104
See application file for complete search history.

(56) References Cited

U.S. PATENT DOCUMENTS

| | | | |
|---|---|---|---|
| 5,513,135 A | 4/1996 | Dell et al. | |
| 5,572,736 A | 11/1996 | Curran | |
| 5,874,833 A | 2/1999 | Perry et al. | |
| 6,381,685 B2 | 4/2002 | Dell et al. | |
| 6,732,214 B1 | 5/2004 | Cohen et al. | |
| 6,763,406 B1 | 7/2004 | Devanney et al. | |
| 6,834,335 B2 | 12/2004 | Fallah et al. | |
| 6,933,863 B2 | 8/2005 | Visalli et al. | |
| 6,982,939 B2 * | 1/2006 | Powelson et al. | 369/47.53 |
| 7,043,670 B2 | 5/2006 | Alani et al. | |
| 7,139,852 B2 | 11/2006 | LaBerge | |
| 7,205,815 B2 | 4/2007 | Park | |
| 7,331,013 B2 * | 2/2008 | Rudosky et al. | 714/795 |
| 7,471,219 B1 * | 12/2008 | Lastras-Montano | 341/83 |
| 7,580,216 B1 * | 8/2009 | Han et al. | 360/75 |
| 7,760,459 B1 * | 7/2010 | Han et al. | 360/75 |
| 7,864,895 B1 * | 1/2011 | Han et al. | 375/341 |
| 2003/0067998 A1 * | 4/2003 | Nakajima et al. | 375/341 |
| 2007/0005282 A1 | 1/2007 | Messier | |

FOREIGN PATENT DOCUMENTS

EP  0186385 A2  7/1986
JP  2001274846 A  10/2001

OTHER PUBLICATIONS

Brhambatt, et al. "Adaptive Low-Power Bus Encoding Based on Weighted Code Mapping". IEEE 0-7803-9390-2/06 ISCAS. Feb. 2006. pp. 1739-1742.

(Continued)

*Primary Examiner* — David Ton
(74) *Attorney, Agent, or Firm* — Cantor Colburn LLP

(57) ABSTRACT

A system and method for providing constrained transmission and storage in a random access memory. A system includes a memory device for providing constrained transmission and storage. The memory device includes an interface to a data bus, the data bus having a previous state. The memory device also includes an interface to an address and command bus for receiving a request to read data at an address, and a mechanism for initiating a programmable mode. The programmable mode facilitates retrieving data at the address, and executing an exclusive or (XOR) using the retrieved data and the previous state of the data bus as input. The result of the XOR operation is transmitted to the requester via the data bus.

19 Claims, 7 Drawing Sheets

OTHER PUBLICATIONS

Stan, et al. "Bus-Invert Coding for Low-Power I/O". IEEE Transactions on Very Large Scale Integration. vol. 3, No. 1. Mar. 1995. pp. 49-58.

Campello, et al. "Constrained Systems With Unconstrained Positions". IEEE Transactions on Information Theory. vol. 48, No. 4. Apr. 2002. pp. 866-879.

Sotiriadis, et al. "Energy Reduction in VLSI Computation Modules: An Information Theoretic Approach". IEEE Transactions on Information Theory. vol. 49, No. 4. Apr. 2003. pp. 790-808.

Cover, Thomas M. "Enumerative Source Encoding". IEE Transactions on Information Theory. vol. IT-19 No. 1. Jan. 1973. pp. 73-77.

Poo, et al. "Tradeoff Functions For Constrained Systems With Unconstrained Positions". IEEE Transactions on Information Theory. vol. 52, No. 4. Apr. 2006. pp. 1425-1449.

Babvey, Sharareh. "Delay and Power Reduction in Deep Submicron Buses". Georgia State University. May 2005.67 pgs.

van Wijngaarden, et al. "Maximum Runglength-Limited Codes with Error Control Capabilities". IEEE Journal on Selected Areas in Communications. vol. 19, No. 4. Apr. 2001. pp. 602-611.

Cheng, et al. "Memory Bus Encoding for Low Power: A Tutorial". IEEE 0-7695-1025-6-01. Jun. 2001. pp. 199-204.

Lastras, Luis. entitled "System and Method for Providing Low Latency Constrained Coding for Parallel Busses". Filed concurrently with present application. Specification having 35 pgs and Drawings having 10 sheets, Aug. 29, 2007.

* cited by examiner

SYSTEM AND METHOD FOR PROVIDING CONSTRAINED TRANSMISSION AND STORAGE IN A RANDOM ACCESS MEMORY

BACKGROUND OF THE INVENTION

This invention relates generally to computer memory, and more particularly to providing constrained transmission and storage in a random access memory.

Significant impairments to signal integrity can occur on an electrical parallel bus when certain data patterns occur. For example, simultaneous switching of a large fraction of data inputs is a significant source of noise in a single-ended transmission bus. Reducing the number of transitions can reduce noise as well as have a positive effect on transmission power consumption.

It would be desirable to be able to incorporate constrained coding and also optionally, error control coding in the data that travels through a bus connected to a random access memory (RAM) (e.g., a memory comprised of dynamic random access memory (DRAM) devices). The use of constrained coding to reduce the number of transitions would improve the signal integrity and/or signaling power consumption in the bus. The error control coding could be utilized to protect against failures in the storage memory, and potentially also against transmission errors.

BRIEF SUMMARY OF THE INVENTION

An exemplary embodiment of the present invention includes a memory device for providing constrained transmission and storage. The memory device includes an interface to a data bus, the data bus having a previous state. The memory device also includes an interface to an address and command bus for receiving a request to read data at an address, and a mechanism for initiating a programmable mode. The programmable mode facilitates retrieving data at the address, and executing an exclusive or (XOR) using the retrieved data and the previous state of the data bus as input. The result of the XOR operation is transmitted to the requester via the data bus.

An additional exemplary embodiment includes a memory device for providing constrained transmission and storage. The memory device includes an interface to a data bus for receiving write data, the data bus having a previous state. The memory device also includes an interface to an address and command bus for receiving a command to write the write data at an address, and a mechanism for initiating a programmable mode. The programmable mode facilitates executing an XOR using the write data and the previous bus state as input. The result of the XOR operation is stored at the address.

A further exemplary embodiment includes a method for constrained transmission and storage in a memory system having a plurality of memory devices. The method includes computer instructions for facilitating receiving write data. Indices of constrained transition patters are generated for the memory devices using the write data as input to the generating. The indices are converted into transition patters. An XOR is executed using the transition patterns and a previous state of a data bus as input. The results of the XOR are transmitted to the memory devices via the data bus.

A further exemplary embodiment includes a method for constrained transmission and storage in a memory system having a plurality of memory devices. The method includes computer instructions for facilitating retrieving a plurality of constrained transition patterns corresponding to read data. An XOR is executed using the transition patterns and a previous state of a data bus as input. The result of the XOR is converted into indices of constrained transition patterns using a constrained decoder. The indices are then converted into the read data.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

In an exemplary embodiment of the present invention constrained coding and also optionally error control coding is incorporated in the data that travels through a bus connected to a RAM (e.g., in a memory that includes DRAM devices). The constrained coding is incorporated in order to improve the signal integrity and/or signaling power consumption in the aforementioned bus. The error control coding is incorporated in order to protect against failures in the storage memory, and potentially also against transmission errors.

Figure 1:
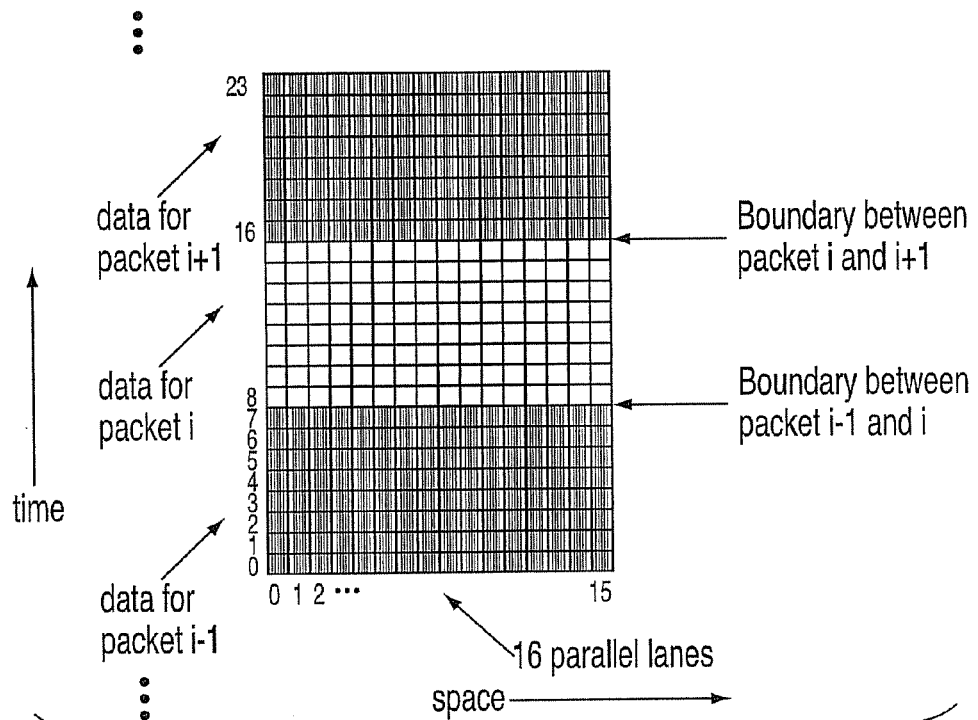
FIG. 1 depicts a data transmission pattern of a memory device that may be utilized by an exemplary embodiment of the present invention.

In some signaling technologies, energy consumption is closely related to the frequency of switching a transmission line from one state (say 0) to another state (say 1) and thus encoding data so that it has reduced switching activity (both average and peal) is a desirable goal. Such encodings are known as "constrained codes" and are well known in the art. In the problem that is addressed in the exemplary embodiments described herein, the information conveyed in the bus is eventually stored in memory during a write or transmitted from the memory to a memory controller during a read operation. A particular challenge is that the memory is read and written in a random access manner whereas it is preferable that all bus transitions be constrained, including those associated with a boundary separating the data from one address from the data of another address. The data transmission pattern of a memory device with sixteen parallel I/O lanes for three packets associated with three different addresses is illustrated in FIG. 1.

If the data is encoded so that during a write operation, the boundaries between packets have constrained switching activity, and the data is stored verbatim in the memory, a problem arises during a read operation which may request the data in any arbitrary order for the addresses, and therefore need not obey any constraint at the boundaries. A solution to this problem is to encode and decode both at the memory and the memory controller but this may not feasible for a number of reasons. One reason is that the constrained coding may require the gathering of the data of multiple DRAM devices in order to perform any coding or decoding (see for example U.S. patent application Ser. No. 11/846,795, entitled "SYSTEM AND METHOD FOR PROVIDING LOW LATENCY CONSTRAINED CODING FOR PARALLEL BUSSES", of common assignment herewith, and herein incorporated by reference in its entirety). Even if this is not the case, it is generally preferable to maintain any additional complexity required from the DRAM device at a minimum.

Another challenge is related to the desirability of protecting the data stored in the memory with an error control code (ECC). This leads to the problem of whether to pass the data first through an ECC encoder and then through a constrained encoder, or the other way around. The first method ensures that the final encoded data is constrained as desired but errors in the data can cause the constrained decoder to fail, further propagating the effect of the error. The simplest application of the second method does not ensure that the encoded data properly satisfies a constraint since the ECC check symbols can tale on arbitrary values.

An exemplary embodiment of the present invention provides constrained transmission and storage in a random access memory both in the case where error control coding is not required and when it is required.

In an exemplary embodiment, a bus with "N" parallel lanes is assumed. A bus state is the value of the "N" bits in a bus at a given time. The first item to address is to define precisely which transitions between one bus state to another bus state are allowed. It is assumed that such transitions are not dependent on the current bus state, but otherwise no additional assumptions are made. Therefore, the set of all allowed transitions can be characterized by a set "A" of allowed transitions. Each member of "A" is a sequence of "N" bits, where a "0" in position "k" means there is no transition in the bus lane "k" and a "1" means there is a transition.

Figure 2:
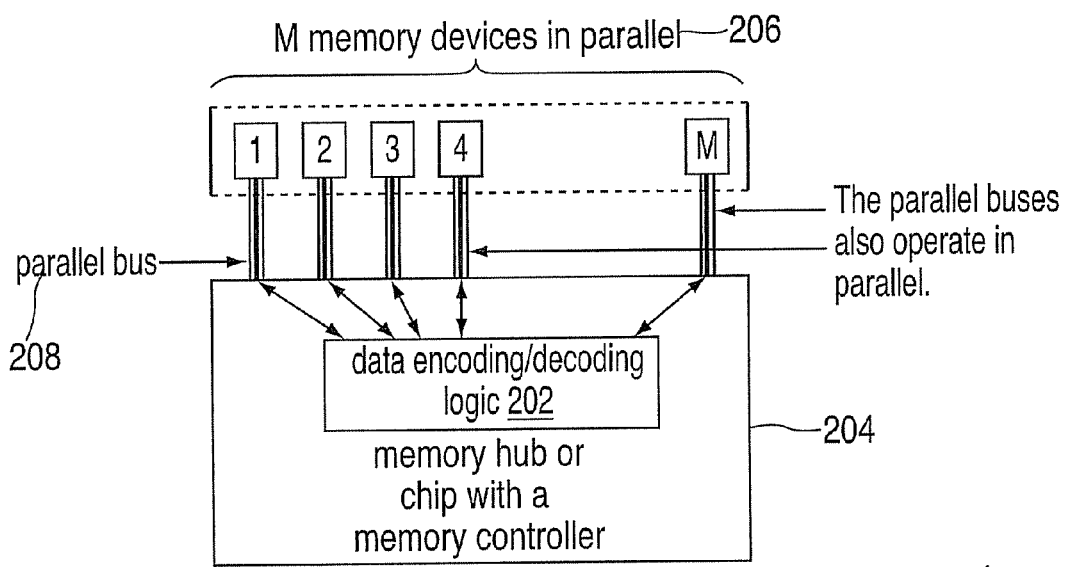
FIG. 2 depicts a memory that may be implemented by an exemplary embodiment.

For example, suppose that "N" is divisible by three and it is desired that no more than N/3 of the lines switch at any given time. In this case, "A" is equal to all binary sequences of length "N" with no more than N/3 ones. It is assumed that the memory is organized using a number, "M", of parallel memory devices (e.g. DRAM) each of which has "N" I/O pins and provides (or is written) data over "b" DRAM "beats" (a beat is a single parallel transfer over the "M" parallel devices). FIG. 2 depicts a memory that may be implemented by an exemplary embodiment. As described previously, the memory in FIG. 2 includes "M" parallel DRAM devices 206 each of which has "N" I/O pins making up a parallel bus 208. The parallel busses 208 for the DRAM devices 206 also operate in parallel to each other to satisfy memory requests. The memory devices 206 are connected to a memory hub or chip with a memory controller 204 via the parallel busses 208. The memory hub or chip with a memory controller 204 includes data encoding/decoding logic 202 to perform the processing described herein.

Figure 3:
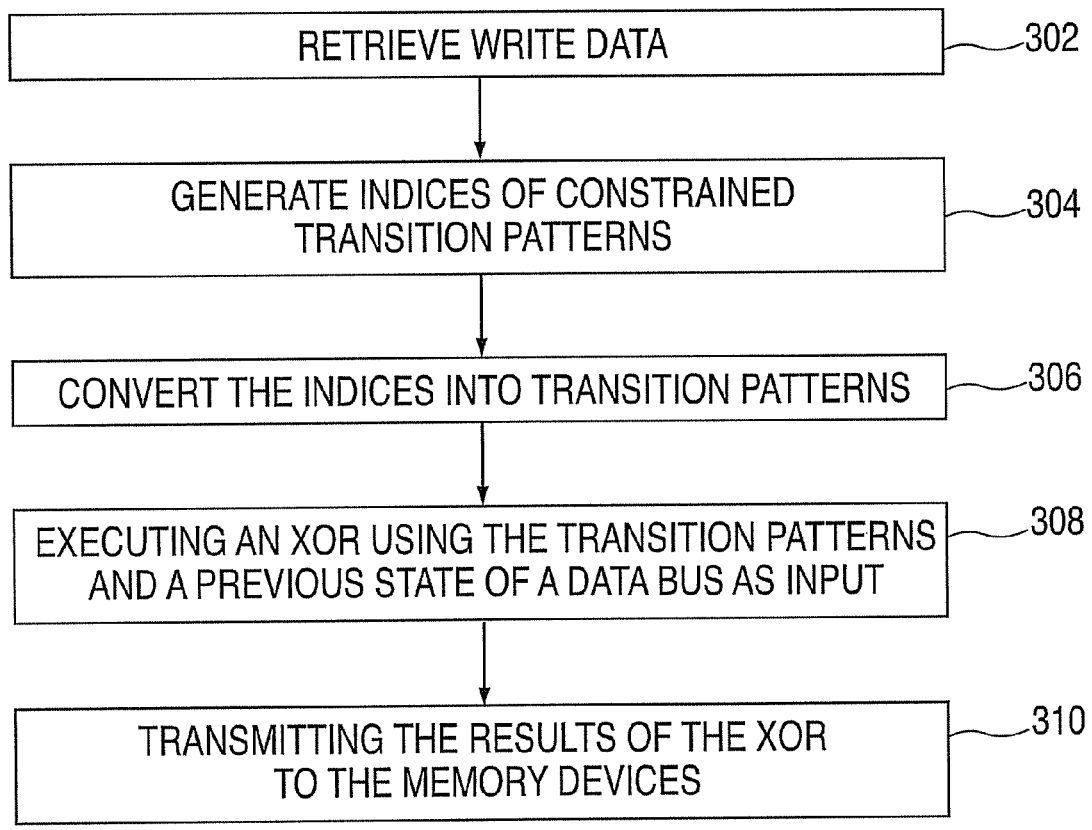
FIG. 3 depicts a process flow for writing data that may be implemented by an exemplary embodiment.

FIG. 3 depicts a process flow for writing data that may be implemented by an exemplary embodiment. In exemplary embodiments, the process flow depicted in FIG. 3 is performed by a memory controller, an off-chip memory controller and/or a hub device. First, it is assumed that no error control coding is necessary. The write operation includes the transmission of information from a memory controller to the memory. At block 302, the write data is retrieved. The data to be encoded and transmitted is assumed to be in a queue. The memory controller obtains from the queue enough bits to form "M" transition indices, each of which selects one transition pattern from the set "A". A transition pattern is a sequence of "N" bits, whereas a transition index is a number between 1 and |A|, where |A| is the cardinality of the set of allowed transition patterns. Given a transition index, the transition pattern can be obtained and vice versa; this is done via the aid of an appropriate constrained encoder/decoder. Furthermore, it is known that generating multiple transition indices (and hence transition patterns) at the same time results in a reduced requirement for the amount of additional redundancy cost in a constrained code. For this reason, it is assumed that the transition indices for all M buses are generated at the same time at block 304. Further exploitation of the idea of generating multiple transition indices at the same time considers generating the transition indices not only for one time beat for all "M" buses, but in general for multiple time beats. This variant may be implemented by an alternate exemplary embodiment of the present invention.

The generation of the indices of constrained transition patterns can be accomplished as described in U.S. patent application Ser. No. 11/846,795, entitled "SYSTEM AND METHOD FOR PROVIDING LOW LATENCY CONSTRAINED CODING FOR PARALLEL BUSSES." At block 306, the indices are converted into transition patterns. At block 308, a logical XOR operation is utilized to compute the next state of the bus by XORing, for each of the M buses, the current bus state with the transition pattern selected, as given by the transition index. This ensures that all transitions between any two bus states are always in the set of allowed transitions "A". At block 310, the results of the XOR are transmitted to the corresponding memory devices.

Figure 4:
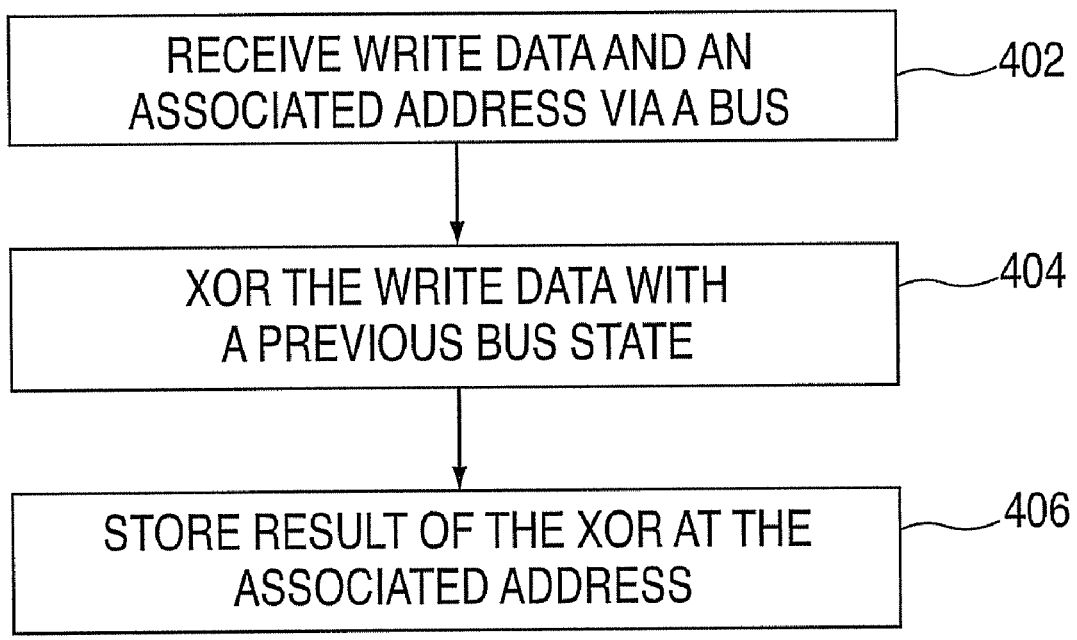
FIG. 4 depicts a process flow for writing data that may be implemented by an exemplary embodiment.

FIG. 4 depicts a process flow for writing data that may be implemented by a memory device in an exemplary embodiment. At block 402, the write data and an associated address are received at the memory device via a bus. The write data is received individually by each of the "M" memory devices. As depicted in the exemplary embodiment in FIG. 9, below, the memory devices 206 have an interface to a data bus for receiving write data and an interface to an address and command bus for receiving a command to write data at an address. At block 404, the transition patterns are retrieved by XORing consecutive received data bus states. The received write data is XORed with a previous data bus state. At block 406, the result of the XOR is stored at the received address, verbatim. In an exemplary embodiment, the processing in blocks 404-406 is executed by a mechanism (i.e., hardware and/or software instructions) in response to an instruction to initiate a programmable mode for performing the processing described in reference to blocks 404-406. In this manner, these steps can be enabled or disabled based on installation requirements.

In an exemplary embodiment, the previous state of the data bus reflects write data received on the data bus immediately prior to the receiving write data (i.e., consecutive received data bus states). In an alternate exemplary embodiment, if the previous state does not reflect write data then a default value is substituted for the previous state prior to executing the XOR. This may occur, for example, if the data bus was last used for a data read or if the bus was simply not used to transmit any data. In an exemplary embodiment, the previous state of the data bus may reflect write data from an address that need not coincide with the address of the write data currently being processed. In an exemplary embodiment, the current bus state refers to the bus that is being read by the current command or the bus that will be written to by the current command.

During a read operation, the transition patterns are retrieved by each of the memory devices and then a similar procedure described for the transmitter at the memory controller is employed, this is, in turn each transition pattern (as given by the transition index) is XORed by the memory device into the previous bus state to produce the next bus state. At the memory controller, the transition patterns are retrieved by an XOR operation again. These transition patterns are then fed to a constrained decoder (at the memory controller) which obtains first the transition indices and then from the indices the original bits stored in the memory, assuming no transmission, storage or encoding/decoding errors.

Figure 5:
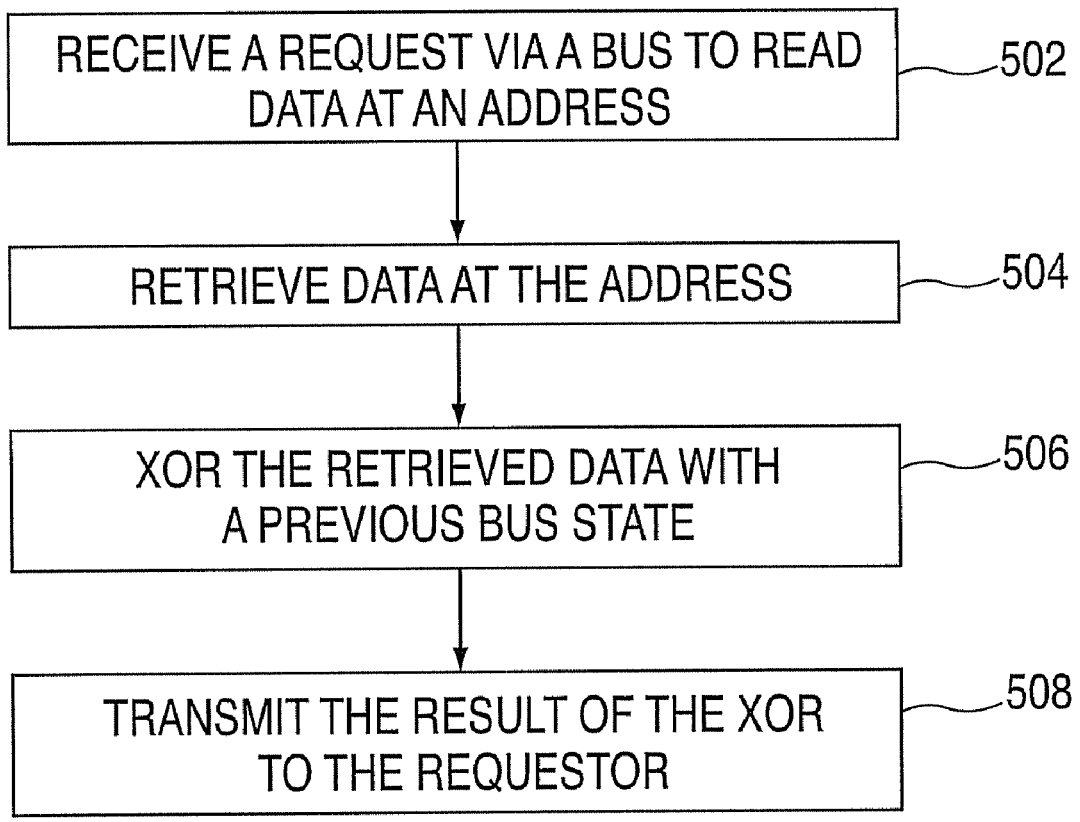
FIG. 5 depicts a process flow for reading data that may be implemented by an exemplary embodiment.

FIG. 5 depicts a process flow for reading data that may be implemented by a memory device in an exemplary embodiment. At block 502, a request is received to read data at an address. At block 504, the data at the address is retrieved. At block 506, the retrieved data is XORed with a previous bus state. At block 508, the result of the XOR is transmitted to the requestor. As depicted in the exemplary embodiment in FIG. 9, below, the memory devices 206 have an interface to a data bus for transmitting data to a requestor (e.g., a memory controller). In an exemplary embodiment, the processing in blocks 504-508 is executed by a mechanism (i.e., hardware and/or software instructions) in response to an instruction to initiate a programmable mode for performing the processing described in reference to blocks 504-508. In this manner, these steps can be enabled or disabled based on installation requirements.

In an exemplary embodiment, the previous state of the data bus reflects data results transmitted to the requester immediately prior to the transmitting the results of the XOR to the requestor (i.e. consecutive received bus states). In an alternate exemplary embodiment, if the previous state does not reflect read data then a default value is substituted for the previous state prior to executing the XOR. This may occur, for example, if the data bus was last utilized for a data write or simply not utilized at all. In an alternate exemplary embodiment, the previous state of the data bus reflects read data from an address that is different than the address in the current request.

Figure 6:
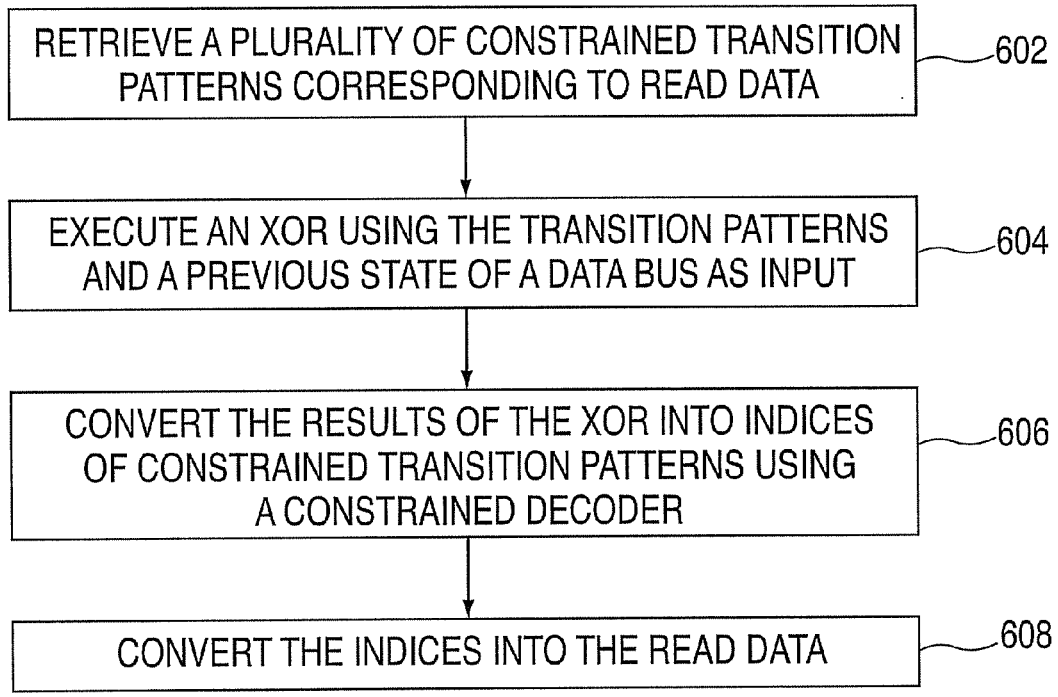
FIG. 6 depicts a process flow for reading data that may be implemented by an exemplary embodiment.

FIG. 6 depicts a process flow for reading data that may be implemented by exemplary embodiments in a memory controller, an off-chip memory controller and/or a hub device. At block 602, a plurality of constrained transition patterns corresponding to read data are received. At block 604, an XOR is executed using the transition patterns and a previous state of a data bus as input. At block 606, the results of the XOR are converted into indices of constrained transition patterns using a constrained decoder. At block 608, the indices are converted into the read data.

It is noted that in the above, no matter what the order is for the addresses during a write and during a read, the patterns in the bus are properly constrained in the boundaries between the data packets of different addresses. This is attained with a minimal complexity increase in the memory device.

Next, a specific example with M=nine total memory devices each with N=sixteen I/O lanes is described. It is assumed that the burst length of each of the memory devices is eight, and therefore each memory device either accepts or retrieves a total of sixteen bytes per access. The goal of this example is to store a 128 byte processor cache line in the memory. When no coding (constrained or error control coding) is employed, a total of eight such devices suffice. The ninth chip in this case is incorporated so as to allow for the constrained coding.

It is assumed that no more than w_max lanes may switch simultaneously in any of the M=nine buses. This means that the set of allowed transitions "A" is defined by A=all binary sequences with w_max ones or less. The cardinality of the set "A" is given by:

$$\sum_{i=0}^{w_{max}} \binom{16}{i}.$$

Therefore, the number of bits that can be encoded during one beat across all M devices is equal to:

$$\left\lfloor M \log_2 \left( \sum_{i=0}^{w_{max}} \binom{16}{i} \right) \right\rfloor.$$

Since there are a total of eight beats available (in other words, the burst length of each of the memory devices is eight), and since a 128 byte cache line must be stored, the quantity above should be least 128 bits. On the other hand, to obtain the maximum possible gain from the constrained coding, it is desired for w_max to be as small as possible. It can be readily verified that the smallest possible w_max is equal to seven, in which case:

$$\left\lfloor 9 \log_2 \left( \sum_{i=0}^{7} \binom{16}{i} \right) \right\rfloor = 132$$

bits. Thus, over the eight beats in the burst a total of 132 bytes are encoded, this is, four bytes more than required, and ensure that the buses connected to the memory, which have sixteen I/O lanes, are such at most seven of the lanes switch simultaneously as a transition occurs from one bus state to the other.

Next, the case where error control coding is combined with the constrained coding is described. It is assumed that out of the "M" parallel memory devices, a subset stores only user data (these are called Category A devices) and the remaining devices store both user data and error control coding information (these are called Category B devices). Those devices in Category A are jointly treated in a manner similar to the one described above where ECC is not being performed.

Figure 7:
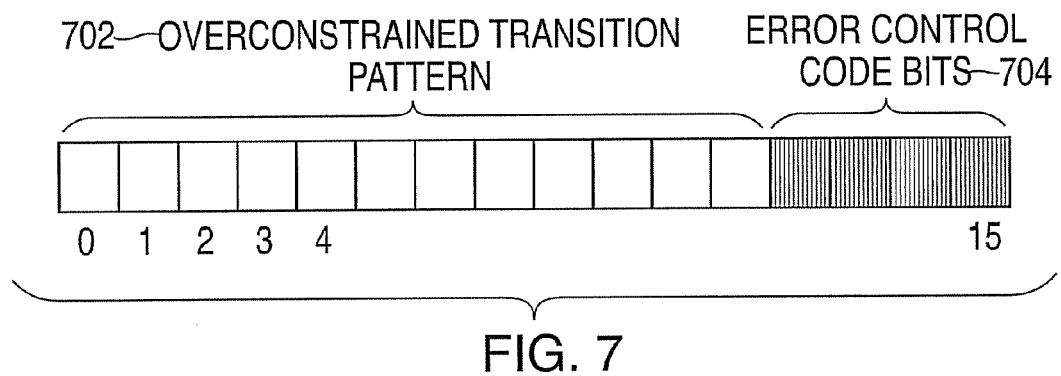
FIG. 7 depicts a composite transition pattern that may be utilized by an exemplary embodiment.

A composite transition pattern is utilized for memory devices in category B. FIG. 7 depicts a composite transition pattern that may be utilized by an exemplary embodiment. The composite data pattern is a result of concatenating an "over constrained transition pattern" 702 with additional "error control code bits" 704. The total number of bits of the concatenation is still "N". The example in FIG. 7 illustrates the case where N=16 with four out of the sixteen bits being devoted to the ECC bits.

In an exemplary embodiment, devices in Category B store composite transition patterns, instead of the transition patterns discussed in the non-ECC case described above. As before, during a write, the memory controller XORs the previous bus state with the composite transition pattern, and the latter is recalculated by the memory device by another XOR operation. During a read operation, the roles of the memory controller and memory device are reversed, and similar operations take place. The over constrained transition pattern 702 is over constrained so that even adding any arbitrary bits in the "error control code bits" 704 would not result in a violation of an overall constraint desired on the composite transition pattern.

In an exemplary embodiment, the steps taken by the memory controller during a write operation are as follows. First assume that there are M_A devices in Category A and M_B devices in Category B. Also assume that it is required that the transitions on each bus are that no more than w_max of the lines switch simultaneously. Further assume that out of the "N" I/O lanes in a Category B device, N_ECC lanes convey error control code bits. Second, the memory controller computes M_A transition patterns from the user data queue, each of which has a weight of at most w_max. The user data queue bits used in this computation are deleted from the queue. Next, the memory controller computes M_B transition patterns, each of which weighs at most w_max-N_ECC. Next, the memory controller computes error control bits for all the transition patterns in Category A and Category B devices calculated above. The memory controller appends the error control bits computed into the placeholders in Category B devices, to form the M_B composite transition patterns. For each of the "M" memory devices, the memory controller XORs the previous bus state with the corresponding transition pattern (composite or not) and inputs the result in the bus.

In order to compute the ECC bits described above, the memory controller may optionally buffer the transition patterns of more than one time beat, withholding the execution of all subsequent steps. This may be done because in general it will improve the error control allowed by the redundant bits.

The steps taken by the memory device during a write operation when ECC is provided are the same as those described previously with respect to FIG. 4. To summarize, the memory device: receives the contents of a bus for one time instant; XORs the received contents with their previous value to form the transition pattern; and stores pattern resulting from the XOR. During a read operation, the memory device: retrieves a stored transition pattern; XORs the previous value of the bus with the transition pattern retrieved; and inputs the result of the above into the channel.

Additionally, during a read operation, the memory controller receives the channel output. The transition patterns and composite transition patterns are computed form the channel output by XORing it to the previous channel output. An error control decoder is applied to the collection of transition and composite transition patterns, and errors are corrected if found. If uncorrectable errors are found, a system flag is raised and this algorithm is exited. A constrained decoder is applied to the transition patterns coming from devices in Category A. The same is done for the overconstrained transition patterns coming from devices in Category B. The result of the decoder are the original store user data bits.

An example follows. The example is similar to the one described above. It is assumed that w_max=ten and "M"=ten. M_A is set to four, and M_B is set to six. As in the example above, the memory devices will have N=16 I/O lanes. From this it can be readily checked that the devices in Category A are capable of receiving/transmitting in one time beat a total of $$\left\lfloor 4\log_2\left(\sum_{i=0}^{10} \binom{16}{i}\right)\right\rfloor = 63$$

user data bits. A total of 128 bits need to be stored, so in the other six devices 65 bits and additional error control coding information needs to be stored. For those devices in Category B. N_ECC is set to four PO lanes. Therefore according to the design methodology described above, it is required that the over constrained transition patterns (which are comprised of twelve bits) in devices of Category B do not allow more than six lanes to switch at any given time. Accordingly, the devices in Category B are capable of receiving/transmitting in one time beat a total of $$\left\lfloor 6\log_2\left(\sum_{i=0}^{7} \binom{12}{i}\right)\right\rfloor = 67$$

user data bits, and in addition they are able to store 6*4=24 error control coding bits. As stated previously, these 24 error control code bits need not protect only the transition patterns stored in the associated time beat; instead it will often be advantageous to delay the generation of the error control coding bits so that they are used to check the transition patterns of multiple time beats. Since 63+67=130 data bits, it can be seen that there is space to store two additional user data bits in addition to the 128 data bits that a cache line will be providing.

Figure 8:
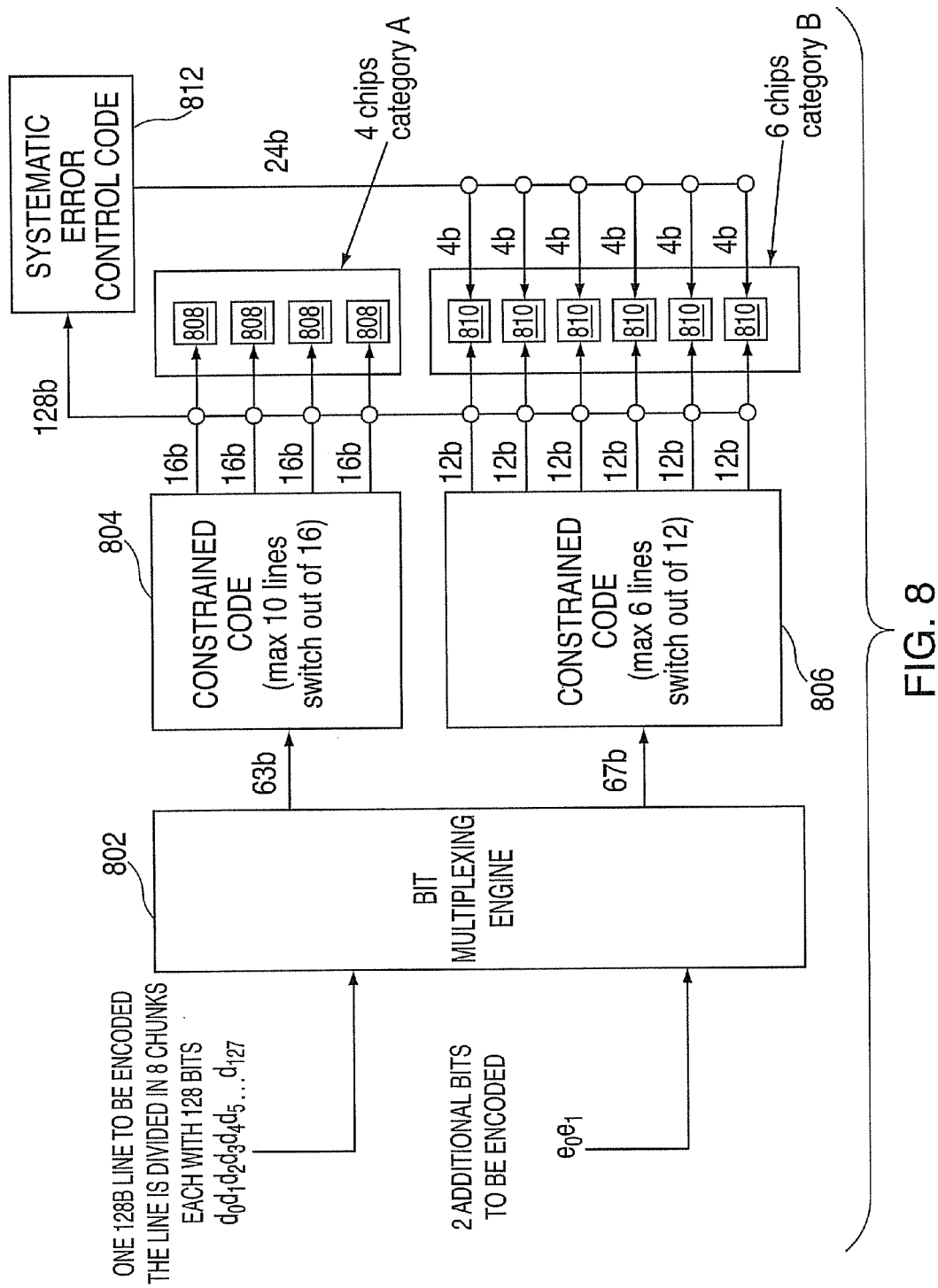
FIG. 8 depicts a decoding process that may be implemented by an exemplary embodiment.

An exemplary encoding procedure performed at a memory controller is illustrated in FIG. 8 for the case where the error control bits only depend on the transition patterns stored in a single time beat. The data to be encoded is represented by d0 d1 d2 ... d127 and is fed to a bit multiplexing engine 802. The design allows for the option of two additional bits to be encoded, denoted by e0 e1 which are also fed to the bit multiplexing engine 802 for a total of 130 data bits. The bit multiplexing engine 802 takes all the 130 bits and produces two packets, one comprised of 63 bits and the other comprised of 67 bits. The former is fed to a constrained coder 804, which uses a previous state of the bus to generate four 16 bit outputs each of which is sent to a x16 DRAM device 808. This constrained coder 804 ensures that no more than 10 lines out of the 16 on each of the four outputs switches from one time instance to another. The second packet of 67 bits generated by the bit multiplexing engine 802 is fed to another constrained encoder 806 which together with a previous bus state, generates six 12 bit signals to be input into the buses connecting to 6 x16 DRAM devices 810. Both the output of the first constrained encoder 804 and second constrained encoder 806 are fed to a systematic error control code 812 which generates 24 bits worth of check symbols which are then split into 6 pieces each comprised of 4 bits each. These 6 pieces are then sent through 4 wires of the x16 DRAM device for storage.

Figure 9:
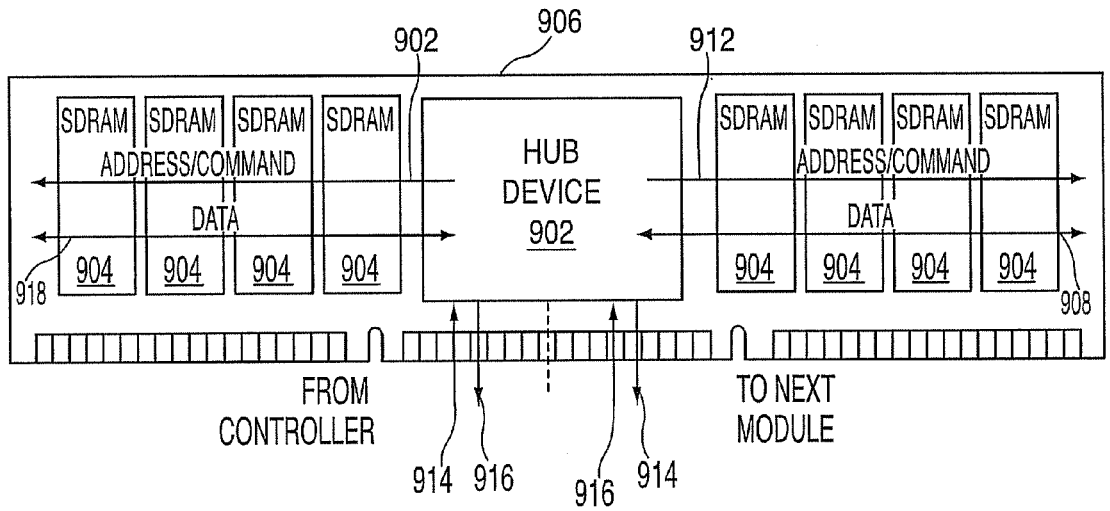
FIG. 9 depicts a buffered memory module that may be implemented by an exemplary embodiment.

FIG. 9 depicts a buffered memory module 906 that includes data encoding/decoding logic 910 in the memory devices 904 that may be implemented by an exemplary embodiment. FIG. 9 is a pictorial representation of a memory module 906, with arrows representing the primary signal flows into and out of the hub device 902. The signal flows include an upstream memory bus 916, a downstream memory bus 914, memory device address and command busses 902 and 912, and memory device data busses 908 and 918. In an exemplary embodiment of the present invention, the hub device 902 provides two copies of the address and command signals to the memory devices 904 with the right memory device address and command bus 912 exiting from the right side of the hub device 902 for the memory devices 904 located to the right side and behind the hub device 902 on the right. The memory devices 904 include interfaces to the memory device address and command busses 902 and 912 and to the memory device data busses 908 and 918. A bus converter within the hub device 902 converts the high speed memory bus data into slower speed address and command signals for communication with the memory devices 904. The left memory device address and command bus 902 exits from the left side of the hub device 902 and connects to the memory devices 904 to the left side and behind the hub device 902 on the left. Similarly, the data bits intended for memory devices 904 to the right of the hub device 902 exit from the right of the buffer device 902 on the right memory device data bus 908. The data bits intended for the left side of the hub device 902 exit from the left of the hub device 902 on the left memory device data bus 918. The high speed upstream memory bus 916 and downstream memory bus 914 exit from the lower portion of the hub device 902, and connect to a memory controller or other memory modules either upstream or downstream of this memory module 906, depending on the application. The hub device 902 receives signals that are four times the memory module data rate and converts them into signals at the memory module data rate.

In an exemplary embodiment, all or a subset of the memory devices 904 are accessed in parallel via the memory device data busses 908 and 918. The data encoding/decoding logic 910 is utilized to the perform the encoding and decoding described herein for data being transmitted via the device data busses 903 and 918. In an exemplary embodiment, data received at the memory device 904 is encoded by the data encoding/decoding logic 910 before being stored in the memory devices 904. In addition, the data is decoded by the data encoding/decoding logic 910 after being retrieved from the memory devices 904 and before being transmitted to the hub device 902.

Figure 10:
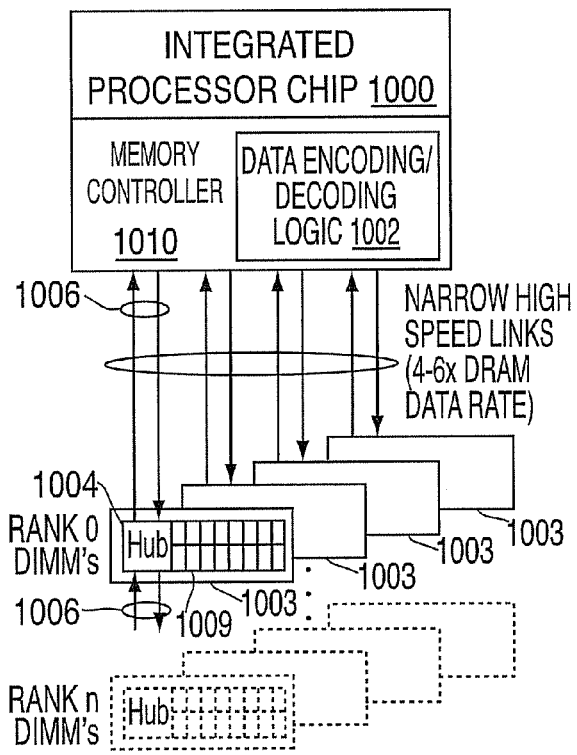
FIG. 10 depicts a cascade interconnect memory system that may be implemented by an exemplary embodiment.

FIG. 10 depicts a cascade interconnect memory system that may be implemented by an exemplary embodiment. FIG. 10 depicts a contemporary system composed of an integrated processor chip 1000, which contains one or more processor elements and an integrated memory controller 1010. Multiple independent cascade interconnected memory interface busses 1006 are logically aggregated together to operate in unison to support a single independent access request at a higher bandwidth with data and error detection/correction information distributed or "striped" across the parallel busses and associated devices. The memory controller 1010 attaches to four narrow/high speed point-to-point memory busses 1006, with each bus 1006 connecting one of the several unique memory controller interface channels to a cascade interconnect memory subsystem 1003 (or memory module, e.g., a DIMM) which includes at least a hub device 1004 and one or more memory devices 1009. Some systems further enable operations when a subset of the memory busses 1006 are populated with memory subsystems 1003. In this case, the one or more populated memory busses 1008 may operate in unison to support a single access request.

In the exemplary embodiment depicted in FIG. 10, the memory controller 1010 includes data encoding/decoding logic 1002 for performing the constraint code processing described herein. In an alternate exemplary embodiment, the data encoding/decoding logic 1002 is located on a hub device or an off chip memory controller. In an exemplary embodiment, the data encoding/decoding logic 1002 is utilized to encode data at the memory controller 1010 before it is sent to the hub devices 1004 for storage in the memory devices 1009. The hub devices 1004 then access the memory devices 1009 and store the encoded data. When data is retrieved from the memory devices 1009, the encoded data is sent to the memory controller where data encoding/decoding logic 1002 decodes the data.

In an exemplary embodiment, hub devices may be connected to the memory controller through a multi-drop or point-to-point bus structure (which may further include a cascade connection to one or more additional hub devices). Memory access requests are transmitted by the memory controller through the bus structure (e.g., the memory bus) to the selected hub(s). In response to receiving the memory access requests, the hub device translates the memory access requests to control the memory devices to store write data from the hub device or to provide read data to the hub device. Read data is encoded into one or more communication packet(s) and transmitted through the memory bus(ses) to the memory controller.

In alternate exemplary embodiments, the memory controller(s) may be integrated together with one or more processor chips and supporting logic, packaged in a discrete chip (commonly called a "northbridge" chip), included in a multi-chip carrier with the one or more processors and/or supporting logic, or packaged in various alternative forms that best match the application/environment. Any of these solutions may or may not employ one or more narrow/high speed links to connect to one or more hub chips and/or memory devices.

The memory modules may be implemented by a variety of technology including a DIMM, a single in-line memory module (SIMM) and/or other memory module or card structures. In general, a DIMM refers to a small circuit board which is comprised primarily of random access memory (RAM) integrated circuits or die on one or both sides with signal and/or power pins on both sides of the board. This can be contrasted to a SIMM which is a small circuit board or substrate composed primarily of RAM integrated circuits or die on one or both sides and single row of pins along one long edge. DIMMs have been constructed with pincounts ranging from 100 pins to over 300 pins. In exemplary embodiments described herein, memory modules may include two or more hub devices.

In exemplary embodiments, the memory bus is constructed using multi-drop connections to hub devices on the memory modules and/or using point-to-point connections. The downstream portion of the controller interface (or memory bus), referred to as the downstream bus, may include command, address, data and other operational, initialization or status information being sent to the hub devices on the memory modules. Each hub device may simply forward the information to the subsequent hub device(s) via bypass circuitry; receive, interpret and re-drive the information if it is determined to be targeting a downstream hub device; re-drive some or all of the information without first interpreting the information to determine the intended recipient; or perform a subset or combination of these options.

The upstream portion of the memory bus, referred to as the upstream bus, returns requested read data and/or error, status or other operational information, and this information may be forwarded to the subsequent hub devices via bypass circuitry; be received, interpreted and re-driven if it is determined to be targeting an upstream hub device and/or memory controller in the processor complex; be re-driven in part or in total without first interpreting the information to determine the intended recipient; or perform a subset or combination of these options.

In alternate exemplary embodiments, the point-to-point bus includes a switch or bypass mechanism which results in the bus information being directed to one of two or more possible hub devices during downstream communication (communication passing from the memory controller to a hub device on a memory module), as well as directing upstream information (communication from a hub device on a memory module to the memory controller), often by way of one or more upstream hub devices. Further embodiments include the use of continuity modules, such as those recognized in the art, which, for example, can be placed between the memory controller and a first populated hub device (i.e., a hub device that is in communication with one or more memory devices), in a cascade interconnect memory system, such that any intermediate hub device positions between the memory controller and the first populated hub device include a means by which information passing between the memory controller and the first populated hub device can be received even if the one or more intermediate hub device position(s) do not include a hub device. The continuity module(s) may be installed in any module position(s), subject to any bus restrictions, including the first position (closest to the main memory controller, the last position (prior to any included termination) or any intermediate position(s). The use of continuity modules may be especially beneficial in a multi-module cascade interconnect bus structure, where an intermediate hub device on a memory module is removed and replaced by a continuity module, such that the system continues to operate after the removal of the intermediate hub device. In more common embodiments, the continuity module(s) would include either interconnect wires to transfer all required signals from the input(s) to the corresponding output(s), or be re-driven through a repeater device. The continuity module(s) might further include a non-volatile storage device (such as an EEPROM), but would not include main memory storage devices.

In exemplary embodiments, the memory system includes one or more hub devices on one or more memory modules connected to the memory controller via a cascade interconnect memory bus, however other memory structures may be implemented such as a point-to-point bus, a multi-drop memory bus or a shared bus. Depending on the signaling methods used, the target operating frequencies, space, power, cost, and other constraints, various alternate bus structures may be considered. A point-to-point bus may provide the optimal performance in systems produced with electrical interconnections, due to the reduced signal degradation that may occur as compared to bus structures having branched signal lines, switch devices, or stubs. However, when used in systems requiring communication with multiple devices or subsystems, this method will often result in significant added component cost and increased system power, and may reduce the potential memory density due to the need for intermediate buffering and/or re-drive.

Although not shown in the Figures, the memory modules or hub devices may also include a separate bus, such as a 'presence detect' bus, an I2C bus and/or an SMBus which is used for one or more purposes including the determination of the hub device an/or memory module attributes (generally after power-up), the reporting of fault or status information to the system, the configuration of the hub device(s) and/or memory subsystem(s) after power-up or during normal operation or other purposes. Depending on the bus characteristics, this bus might also provide a means by which the valid completion of operations could be reported by the hub devices and/or memory module(s) to the memory controller(s), or the identification of failures occurring during the execution of the main memory controller requests.

Performances similar to those obtained from point-to-point bus structures can be obtained by adding switch devices. These and other solutions offer increased memory packaging density at lower power, while retaining many of the characteristics of a point-to-point bus. Multi-drop busses provide an alternate solution, albeit often limited to a lower operating frequency, but at a cost/performance point that may be advantageous for many applications. Optical bus solutions permit significantly increased frequency and bandwidth potential, either in point-to-point or multi-drop applications, but may incur cost and space impacts.

As used herein the term "buffer" or "buffer device" refers to a temporary storage unit (as in a computer), especially one that accepts information at one rate and delivers it another. In exemplary embodiments, a buffer is an electronic device that provides compatibility between two signals (e.g., changing voltage levels or current capability). The term "hub" is sometimes used interchangeably with the term "buffer." A hub is a device containing multiple ports that is connected to several other devices. A port is a portion of an interface that serves a congruent I/O functionality (e.g., a port may be utilized for sending and receiving data, address, and control information over one of the point-to-point links, or busses). A hub may be a central device that connects several systems, subsystems, or networks together. A passive hub may simply forward messages, while an active hub, or repeater, amplifies and refreshes the stream of data which otherwise would deteriorate over a distance. The term hub device, as used herein, refers to a hub chip that includes logic (hardware and/or software) for performing memory functions.

Also as used herein, the term "bus" refers to one of the sets of conductors (e.g., wires, and printed circuit board traces or connections in an integrated circuit) connecting two or more functional units in a computer. The data bus, address bus and control signals, despite their names, constitute a single bus since each are often useless without the others. A bus may include a plurality of signal lines, each signal line having two or more connection points, that form a main transmission path that electrically connects two or more transceivers, transmitters and/or receivers. The term "bus" is contrasted with the term "channel" which is often used to describe the function of a "port" as related to a memory controller in a memory system, and which may include one or more busses or sets of busses. The term "channel" as used herein refers to a port on a memory controller. Note that this term is often used in conjunction with I/O or other peripheral equipment, however the term channel has been adopted by some to describe the interface between a processor or memory controller and one of one or more memory subsystem(s).

Further, as used herein, the term "daisy chain" refers to a bus wiring structure in which, for example, device A is wired to device B, device B is wired to device C, etc. The last device is typically wired to a resistor or terminator. All devices may receive identical signals or, in contrast to a simple bus, each device may modify one or more signals before passing them on. A "cascade" or cascade interconnect as used herein refers to a succession of stages or units or a collection of interconnected networking devices, typically hubs, in which the hubs operate as a logical repeater, further permitting merging data to be concentrated into the existing data stream. Also as used herein, the term "point-to-point" bus and/or link refers to one or a plurality of signal lines that may each include one or more terminators. In a point-to-point bus and/or link, each signal line has two transceiver connection points, with each transceiver connection point coupled to transmitter circuitry, receiver circuitry or transceiver circuitry. A signal line refers to one or more electrical conductors or optical carriers, generally configured as a single carrier or as two or more carriers, in a twisted, parallel, or concentric arrangement, used to transport at least one logical signal.

Memory devices are generally defined as integrated circuits that are composed primarily of memory (storage) cells, such as DRAMs (Dynamic Random Access Memories), SRAMs (Static Random Access Memories), FeRAMs (Ferro-Electric RAMs), MRAMs (Magnetic Random Access Memories), Flash Memory and other forms of random access and related memories that store information in the form of electrical, optical, magnetic, biological or other means. Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs or any of the expected follow-on devices such as DDR2, DDR3, DDR4 and related technologies such as Graphics RAMs, Video RAMs, LP RAM (Low Power DRAMs) which are often based on the fundamental functions, features and/or interfaces found on related DRAMs.

Memory devices may be utilized in the form of chips (die) and/or single or multi-chip packages of various types and configurations. In multi-chip packages, the memory devices may be packaged with other device types such as other memory devices, logic chips, analog devices and programmable devices, and may also include passive devices such as resistors, capacitors and inductors. These packages may include an integrated heat sink or other cooling enhancements, which may be further attached to the immediate carrier or another nearby carrier or heat removal system.

Module support devices (such as buffers, hubs, hub logic chips, registers, PLL's, DLL's, non-volatile memory, etc) may be comprised of multiple separate chips and/or components, may be combined as multiple separate chips onto one or more substrates, may be combined onto a single package or even integrated onto a single device—based on technology, power, space, cost and other tradeoffs. In addition, one or more of the various passive devices such as resistors, capacitors may be integrated into the support chip packages, or into the substrate, board or raw card itself, based on technology, power, space, cost and other tradeoffs. These packages may include an integrated heat sink or other cooling enhancements, which may be further attached to the immediate carrier or another nearby carrier or heat removal system.

Memory devices, hubs, buffers, registers, clock devices, passives and other memory support devices and/or components may be attached to the memory subsystem and/or hub device via various methods including solder interconnects, conductive adhesives, socket structures, pressure contacts and other methods which enable communication between the two or more devices via electrical, optical or alternate means.

The one or more memory modules (or memory subsystems) and/or hub devices may be electrically connected to the memory system, processor complex, computer system or other system environment via one or more methods such as soldered interconnects, connectors, pressure contacts, conductive adhesives, optical interconnects and other communication and power delivery methods. Connector systems may include mating connectors (male/female), conductive contacts and/or pins on one carrier mating with a male or female connector, optical connections, pressure contacts (often in conjunction with a retaining mechanism) and/or one or more of various other communication and power delivery methods. The interconnection(s) may be disposed along one or more edges of the memory assembly and/or placed a distance from an edge of the memory subsystem depending on such application requirements as ease-of-upgrade/repair, available space/volume, heat transfer, component size and shape and other related physical, electrical, optical, visual/physical access, etc. Electrical interconnections on a memory module are often referred to as contacts, or pins, or tabs. Electrical interconnections on a connector are often referred to as contacts or pins.

As used herein, the term memory subsystem refers to, but is not limited to: one or more memory devices; one or more memory devices and associated interface and/or timing/control circuitry; and/or one or more memory devices in conjunction with a memory buffer, hub device, and/or switch. The term memory subsystem may also refer to one or more memory devices, in addition to any associated interface and/or timing/control circuitry and/or a memory buffer, hub device or switch, assembled into a substrate, a card, a module or related assembly, which may also include a connector or similar means of electrically attaching the memory subsystem with other circuitry. The memory modules described herein may also be referred to as memory subsystems because they include one or more memory devices and hub devices.

Additional functions that may reside local to the memory subsystem and/or hub device include write and/or read buffers, one or more levels of memory cache, local pre-fetch logic, data encryption/decryption, compression/decompression, protocol translation, command prioritization logic, voltage and/or level translation, error detection and/or correction circuitry, data scrubbing, local power management circuitry and/or reporting, operational and/or status registers, initialization circuitry, performance monitoring and/or control, one or more co-processors, search engine(s) and other functions that may have previously resided in other memory subsystems. By placing a function local to the memory subsystem, added performance may be obtained as related to the specific function, often while making use of unused circuits within the subsystem.

Memory subsystem support device(s) may be directly attached to the same substrate or assembly onto which the memory device(s) are attached, or may be mounted to a separate interposer or substrate also produced using one or more of various plastic, silicon, ceramic or other materials which include electrical, optical or other communication paths to functionally interconnect the support device(s) to the memory device(s) and/or to other elements of the memory or computer system.

Information transfers (e.g. packets) along a bus, channel, link or other naming convention applied to an interconnection method may be completed using one or more of many signaling options. These signaling options may include such methods as single-ended, differential, optical or other approaches, with electrical signaling further including such methods as voltage or current signaling using either single or multi-level approaches. Signals may also be modulated using such methods as time or frequency, non-return to zero, phase shift keying, amplitude modulation and others. Voltage levels are expected to continue to decrease, with 1.5V, 1.2V, 1V and lower signal voltages expected consistent with (but often independent of) the reduced power supply voltages required for the operation of the associated integrated circuits themselves.

One or more clocking methods may be utilized within the memory subsystem and the memory system itself, including global clocking, source-synchronous clocking, encoded clocking or combinations of these and other methods. The clock signaling may be identical to that of the signal lines themselves, or may utilize one of the listed or alternate methods that is more conducive to the planned clock frequency(ies), and the number of clocks planned within the various subsystems. A single clock may be associated with all communication to and from the memory, as well as all clocked functions within the memory subsystem, or multiple clocks may be sourced using one or more methods such as those described earlier. When multiple clocks are used, the functions within the memory subsystem may be associated with a clock that is uniquely sourced to the subsystem, or may be based on a clock that is derived from the clock related to the information being transferred to and from the memory subsystem (such as that associated with an encoded clock). Alternately, a unique clock may be used for the information transferred to the memory subsystem, and a separate clock for information sourced from one (or more) of the memory subsystems. The clocks themselves may operate at the same or frequency multiple of the communication or functional frequency, and may be edge-aligned, center-aligned or placed in an alternate timing position relative to the data, command or address information.

Information passing to the memory subsystem(s) will generally be composed of address, command and data, as well as other signals generally associated with requesting or reporting status or error conditions, resetting the memory, completing memory or logic initialization and other functional, configuration or related information. Information passing from the memory subsystem(s) may include any or all of the information passing to the memory subsystem(s), however generally will not include address and command information. This information may be communicated using communication methods that may be consistent with normal memory device interface specifications (generally parallel in nature), the information may be encoded into a 'packet' structure, which may be consistent with future memory interfaces or simply developed to increase communication bandwidth and/or enable the subsystem to operate independently of the memory technology by converting the received information into the format required by the receiving device(s).

Initialization of the memory subsystem may be completed via one or more methods, based on the available interface busses, the desired initialization speed, available space, cost/complexity objectives, subsystem interconnect structures, the use of alternate processors (such as a service processor) which may be used for this and other purposes, etc. In one embodiment, the high speed bus may be used to complete the initialization of the memory subsystem(s), generally by first completing a training process to establish reliable communication, then by interrogation of the attribute or 'presence detect' data associated the various components and/or characteristics associated with that subsystem, and ultimately by programming the appropriate devices with information associated with the intended operation within that system. In a cascaded system, communication with the first memory subsystem would generally be established, followed by subsequent (downstream) subsystems in the sequence consistent with their position along the cascade interconnect bus.

A second initialization method would include one in which the high speed bus is operated at one frequency during the initialization process, then at a second (and generally higher) frequency during the normal operation. In this embodiment, it may be possible to initiate communication with all of the memory subsystems on the cascade interconnect bus prior to completing the interrogation and/or programming of each subsystem, due to the increased timing margins associated with the lower frequency operation.

A third initialization method might include operation of the cascade interconnect bus at the normal operational frequency(ies), while increasing the number of cycles associated with each address, command and/or data transfer. In one embodiment, a packet containing all or a portion of the address, command and/or data information might be transferred in one clock cycle during normal operation, but the same amount and/or type of information might be transferred over two, three or more cycles during initialization. This initialization process would therefore be using a form of 'slow' commands, rather than 'normal' commands, and this mode might be automatically entered at some point after power-up and/or re-start by each of the subsystems and the memory controller by way of POR (power-on-reset) logic included in each of these subsystems.

A fourth initialization method might utilize a distinct bus, such as a presence detect bus (such as the one defined in U.S. Pat. No. 5,513,135 to Dell et al., of common assignment herewith), an I2C bus (such as defined in published JEDEC standards such as the 168 Pin DIMM family in publication 21-C revision 7R8) and/or the SMBUS, which has been widely utilized and documented in computer systems using such memory modules. This bus might be connected to one or more modules within a memory system in a daisy chain/cascade interconnect, multi-drop or alternate structure, providing an independent means of interrogating memory subsystems, programming each of the one or more memory subsystems to operate within the overall system environment, and adjusting the operational characteristics at other times during the normal system operation based on performance, thermal, configuration or other changes desired or detected in the system environment.

Other methods for initialization can also be used, in conjunction with or independent of those listed. The use of a separate bus, such as described in the fourth embodiment above, also offers the advantage of providing an independent means for both initialization and uses other than initialization, such as described in U.S. Pat. No. 6,381,685 to Dell et al., of common assignment herewith, including changes to the subsystem operational characteristics on-the-fly and for the reporting of and response to operational subsystem information such as utilization, temperature data, failure information or other purposes.

With improvements in lithography, better process controls, the use of materials with lower resistance, increased field sizes and other semiconductor processing improvements, increased device circuit density (often in conjunction with increased die sizes) will help facilitate increased function on integrated devices as well as the integration of functions previously implemented on separate devices. This integration will serve to improve overall performance of the intended function, as well as promote increased storage density, reduced power, reduced space requirements, lower cost and other manufacturer and customer benefits. This integration is a natural evolutionary process, and may result in the need for structural changes to the fundamental building blocks associated with systems.

The integrity of the communication path, the data storage contents and all functional operations associated with each element of a memory system or subsystem can be assured, to a high degree, with the use of one or more fault detection and/or correction methods. Any or all of the various elements may include error detection and/or correction methods such as CRC (Cyclic Redundancy Code), EDC (Error Detection and Correction), parity or other encoding/decoding methods suited for this purpose. Further reliability enhancements may include operation re-try (to overcome intermittent faults such as those associated with the transfer of information), the use of one or more alternate or replacement communication paths to replace failing paths and/or lines, complement-re-complement techniques or alternate methods used in computer, communication and related systems.

The use of bus termination, on busses as simple as point-to-point links or as complex as multi-drop structures, is becoming more common consistent with increased performance demands. A wide variety of termination methods can be identified and/or considered, and include the use of such devices as resistors, capacitors, inductors or any combination thereof, with these devices connected between the signal line and a power supply voltage or ground, a termination voltage or another signal. The termination device(s) may be part of a passive or active termination structure, and may reside in one or more positions along one or more of the signal lines, and/or as part of the transmitter and/or receiving device(s). The terminator may be selected to match the impedance of the transmission line, or selected via an alternate approach to maximize the useable frequency, operating margins and related attributes within the cost, space, power and other constraints.

Technical effects and benefits include the ability to incorporate constrained coding and also optionally error control coding in the data that travels through a bus connected to a RAM. The use of constrained coding may improve the signal integrity and/or signaling power consumption in the aforementioned bus. The use of error control coding may protect against failures in the storage memory, and potentially also against transmission errors.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A memory device comprising:
an interface to a data bus, the data bus having a previous state;
an interface to an address and command bus for receiving a request to read data at an address; and
a mechanism for initiating a programmable mode for facilitating:
retrieving data at the address;
executing an exclusive or (XOR) using the retrieved data and the previous state of the data bus as input; and
transmitting the result of the XOR to the requestor via the data bus.

2. The memory device of claim 1 wherein the previous state of the data bus reflects data results transmitted to the requestor immediately prior to the transmitting the results of the XOR to the requester.

3. The memory device of claim 1 wherein if the previous state of the data bus does not reflect read data then a default value is substituted for the previous state of the data bus prior to executing the XOR.

4. The memory device of claim 1 wherein the previous state of the data bus reflects read data from an address that is different than the address in the request.

5. The memory device of claim 1 wherein the read data includes one or more error code correction (ECC) bits.

6. A memory device comprising:
an interface to a data bus for receiving write data, the data bus having a previous state;
an interface to an address and command bus for receiving a command to write the write data at an address; and
a mechanism for initiating a programmable mode for facilitating:
executing an XOR using the write data and the previous bus state as input; and
storing the result of the XOR at the address.

7. The memory device of claim 6 wherein the previous state of the data bus reflects write data received on the data bus immediately prior to the receiving write data.

8. The memory device of claim 6 wherein if the previous state of the data bus does not reflect write data then a default value is substituted for the previous state of the data bus prior to executing the XOR.

9. The memory device of claim 6 wherein the previous state of the data bus reflects write data from an address that is different than the address in the command.

10. The memory device of claim 6 wherein the write data includes one or more ECC bits.

11. A method for constrained transmission and storage in a memory system having a plurality of memory devices, the method comprising computer instructions for facilitating:
receiving write data;
generating indices of constrained transition patterns for the memory devices using the write data as input to the generating;
converting the indices into transition patterns;
executing an XOR using the transition patterns and a previous state of a data bus as input; and
transmitting the result of the XOR to the memory devices via the data bus.

12. The method of claim 11 further comprising inserting ECC bits into one or more of the transition patterns.

13. The method of claim 12 wherein the transition patterns having the ECC bits are over constrained to account for the ECC bits.

14. The method of claim 11 wherein the method is performed by a memory controller.

15. The method of claim 11 wherein the method is performed by one or more of a hub device and an off-chip memory controller.

16. A method for constrained transmission and storage in a memory system having a plurality of memory device, the method comprising computer instructions for facilitating:
retrieving a plurality of constrained transition patterns corresponding to read data;
executing an XOR using the transition patterns and a previous state of a data bus as input;
converting the result of the XOR into indices of constrained transition patterns using a constrained decoder; and
converting the indices into the read data.

17. The method of claim 16 further comprising applying an ECC decoder to the results of the XOR and replacing the results of the XOR with the output from the ECC decoder before performing the converting the results of the XOR, the applying including correcting any correctable errors.

18. The method of claim 16 wherein the method is performed by a memory controller.

19. The method of claim 16 wherein the method is performed by one or more of a hub device and an off-chip memory controller.

* * * * *